(12) United States Patent
Gallet et al.

(10) Patent No.: US 8,862,898 B2
(45) Date of Patent: Oct. 14, 2014

(54) SECURE ENVIRONMENT MANAGEMENT DURING SWITCHES BETWEEN DIFFERENT MODES OF MULTICORE SYSTEMS

(75) Inventors: Gilles Gallet, Ampuls (FR); Eric Malbranche, Grenoble (FR); Mickael Guene, Saint-Paul-de-Varces (FR); Franck Denat, Oz-en-Oisans (FR)

(73) Assignee: ST-Ericsson SA, Plan-les-Ouates (CH)

( * ) Notice: Subject to any disclaimer, the term of this patent is extended or adjusted under 35 U.S.C. 154(b) by 141 days.

(21) Appl. No.: 13/574,548

(22) PCT Filed: Jan. 21, 2011

(86) PCT No.: PCT/EP2011/050848
§ 371 (c)(1),
(2), (4) Date: Jul. 20, 2012

(87) PCT Pub. No.: WO2011/089231
PCT Pub. Date: Jul. 28, 2011

(65) Prior Publication Data
US 2012/0297202 A1 Nov. 22, 2012

(30) Foreign Application Priority Data
Jan. 22, 2010 (EP) .................................... 10305077
Nov. 12, 2010 (EP) .................................... 10191115

(51) Int. Cl.
G06F 9/46 (2006.01)
G06F 12/14 (2006.01)
G06F 1/32 (2006.01)
G06F 21/74 (2013.01)
G06F 21/81 (2013.01)

(52) U.S. Cl.
CPC ........... *G06F 1/3243* (2013.01); *Y02B 60/1239* (2013.01); *G06F 1/3203* (2013.01); *G06F 21/74* (2013.01); *G06F 21/81* (2013.01)
USPC ............................................ 713/189; 719/313

(58) Field of Classification Search
USPC ............................................ 713/189; 719/313
See application file for complete search history.

(56) References Cited

U.S. PATENT DOCUMENTS 6,209,088 B1 * 3/2001 Reneris ............................ 713/1
2008/0201592 A1 * 8/2008 Lawrence et al. .............. 713/323
(Continued)

FOREIGN PATENT DOCUMENTS

GB 2403561 A 1/2005
GB 2446658 A 8/2008

OTHER PUBLICATIONS

T. Alves et al., TrustZone: Integrated Hardware and Software Security Enabling Trusted Computing in Embedded Systems, Information Quarterly, 2004, pp. 18-24, vol. 3, No. 4.
(Continued)

*Primary Examiner* — Kambiz Zand
*Assistant Examiner* — Aubrey Wyszynski
(74) *Attorney, Agent, or Firm* — Piedmont Intellectual Property

(57) ABSTRACT

The invention relates to the switching from a first mode of operation to a second mode, of a first and a second cores of a processor of a processing device further comprising a controller. The controller sends a first message to the cores. Upon reception of the first message, sensible data handled by the cores are stored securely. The second core sends, to the first core, a second message indicating the completion of the step of storing its sensible data. Upon reception of the second message, the first core stores securely, in a storage unit, other sensible data, and, when finished, sends to the controller a third message. Upon reception of the third message, the controller sends to the first core a fourth message. Then, the first core sends a fifth message to the second core. Upon reception of the fourth and the fifth messages, the cores enter into the second mode.

15 Claims, 2 Drawing Sheets

(56) References Cited

U.S. PATENT DOCUMENTS

2008/0226078 A1* 9/2008 Gabryjelski et al. .......... 380/277
2009/0157936 A1 6/2009 Goss et al.
2009/0172411 A1 7/2009 Kershaw et al.

OTHER PUBLICATIONS

EPO, Int'l Search Report in PCT/EP2011/050848, Apr. 29, 2011.
EPO, Written Opinion in PCT/EP2011/050848, Apr. 29, 2011.

* cited by examiner

SECURE ENVIRONMENT MANAGEMENT DURING SWITCHES BETWEEN DIFFERENT MODES OF MULTICORE SYSTEMS

TECHNICAL FIELD

The present invention generally relates to devices and methods for the management of a secure environment of a chip. It concerns more particularly the storage and/or the retrieving of sensitive data, in multicore systems, during transitional phases between an active mode and a low power mode of operation.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section. Furthermore, all embodiments are not necessarily intended to solve all or even any of the problems brought forward in this section.

A System-on-Chip (SoC) platform typically comprises at least one embedded Central Processing Unit (CPU), at least one embedded functional unit (also called an IP in the jargon of the one with ordinary skills in the art) which may be a memory (for instance of the eSRAM type), a Memory Management Unit (MMU), and/or at least one register. The components of the SoC are typically interconnected through an internal bus matrix.

In operation, the SoC platform may be led to manipulate sensitive data, for instance, cryptographic secret keys or unencoded secret data like passwords. To prevent unauthorized access to and/or corruption of these sensitive data, the architecture of the SoC platform may be split into two physically and functionally separated environments: a secure environment for manipulating sensitive data and a public environment for processing non-sensitive data. The secure environment comprises notably one or more dedicated secure memories and/or one or more secure hardware registers to store sensitive data, whereas the public environment may include its own dedicated memories and/or hardware registers to store public data.

This separation is for example implemented by Advanced RISC Machine (ARM) SoC platforms with security extensions, for example the TrustZone technology. A clear frontier between these two environments may be implemented with hardware (HW) and/or software (SW) mechanisms embedded in the processor, in the bus matrix, and in the IPs themselves. This frontier ensures that secure data within the secure environment cannot be accessed by any public component belonging to the public environment. This may typically be the case for normal modes of operation of the platform, wherein memories, IPs and processors are kept powered-on or in retention. However, some power modes are available wherein one or more of the secure components can be powered off, meaning that at least some of their contents have to be saved during the particular mode and be restored thereafter. Such modes may be available for the purpose of optimizing the power strategy of the chip and decrease energy leakages.

A dedicated persistent secure memory, included in the secure environment, may be used to store securely sensitive data present in the secure environment before switching from a power-on mode to an energy saving mode. However, there might be cases where not enough secure memory space is available to save all secure contents. Consequently, in such cases, it may be necessary to store sensitive data outside the secure environment, in a non secure storage for example. It may be desirable that such storage can be made efficiently and securely.

This task is rendered particularly difficult when the SoC platform comprises a CPU having a plurality of cores embedding security extensions, since the sensitive data may be spread between several cores.

Another important issue may be to be able to guarantee data confidentiality and integrity to avoid leakage of secure information in the public environment during periods where secure data are stored in unsecure storage, and to avoid secure data corruption.

Another aspect that may be considered concerns performances since one or several constraints may be inherent for low-power modes. The impact of the constraints on performances may preferably be as low as possible, so that the global platform strategy is not jeopardized.

Thus, embodiments of the present invention aim at solving at least some of the following problems:
  How to store sensitive data handled by a multicore system in a first mode of operation, following a request to switch to a second mode of operation.
  Ensuring confidentiality and/or integrity for said stored sensitive data.
  Limiting impact on system performances.

SUMMARY

To address these needs, a first aspect of the present invention relates to a method of managing switching from a first mode of operation to a second mode, of a first core and at least one second core both included in a processor of a processing device. The processing device and the first and second cores of the processor are adapted to securely handle sensitive data when being in the first mode. The processing device further comprises a controller to control the switching to the second mode. The processor is coupled to a storage unit adapted to ensure persistency of data therein during periods of time when the first and the second cores are in the second mode. The method comprises the following steps:
  a step of sending, by the controller to the first core and to the second core, of a first message;
  upon reception of the first message by the first and second core respectively,
    a first step of storing securely sensitive data handled by the first core;
    a second step of storing securely sensitive data handled by the second core;
  a step of sending, by the second core to the first core, of a second message indicating the completion of the second step of storing;
  upon reception of the second message by the first core, a third step, driven by the first core, of storing securely, in the storage unit, other sensitive data;
  a step of sending, by the first core to the controller of a third message indicating the completion of the third step of storing;
  upon reception of the third message by the controller, a step of sending, by the controller to the first core, of a fourth message to acknowledge reception of the third message;
  upon reception of the fourth message by the first core, a step of sending, by the first core to the second core, of a fifth message;

upon reception of the fourth and the fifth messages by the first and second cores respectively, a step of entering by the first and the second cores into the second mode.

The third step of storing (driven by the first core) may comprise storing of sensitive data handled by the processing device, such as, for example, a context common to the first and second cores (i.e. processor data). However, it should be noted that (alternatively or additionally) it may comprise storing of sensitive data not bound to the processing device itself, such as an IP context or a memories context.

The method according to some embodiments of the first aspect may allow reducing the power consumption of multicore processors by providing an efficient way to switch off the cores, without compromising the confidentiality of sensitive data of the secure environment. The method according to some embodiments may provide a reliable and efficient solution to synchronize the switching of the different cores of the processor. Moreover, the amount of data that may be stored when the cores are in the second mode is in typical embodiments only limited by the available free space of the storage unit. Thus, in some embodiments, there is no need for the storage unit to provide security mechanisms for the purpose of protecting the secure data. Hence, the global cost and performance overhead of the method may be reduced.

In some embodiments, at least one of the first, second and third steps of storing are performed by:
collecting the sensitive data to be stored;
encrypting, based on at least one first set of data, the collected sensitive data;
storing the first set of data in a secure memory included in the processor, said secure memory being persistent during the periods of time when the first and the second cores are in the second mode;
storing, in the storage unit, the encrypted sensitive data.

According to some embodiments, the method can also further comprise a step, preceding the step of encrypting, wherein the collected sensitive data are split into subsets of sensitive data. Then, during the step of encrypting, a respective first set of data can be used for each subset of sensitive data, improving notably the confidentiality level of the method. In some embodiments, only a seed value used to generate the respective first set of data with a crypto-algorithm may be stored in the secure memory. Hence, the size of data stored in the secure memory is decreased.

According to some embodiments, the method can also further comprise, to improve the integrity of the sensitive data, a step of generating a hash value, by applying a cryptographic hash function to the encrypted sensitive data or to each encrypted subset, and a step of storing the calculated hash value in the secure memory.

According to some embodiments, the method can further comprise the following steps, when switching back from the second mode to the first mode of operation:
retrieving the encrypted sensitive data or the subsets stored in the storage unit;
retrieving the first set of data stored in the secure memory;
decrypting the retrieved encrypted sensitive data or the subsets using the retrieved first set of data;
restoring the decrypted sensitive data.

According to some embodiments, the method can further comprise the steps of:
retrieving the hash values stored in the secure memory,
calculating a hash value for the retrieved encrypted sensitive data or for each encrypted subsets, and
comparing to the hash values retrieved from the secure memory to the calculated hash value;
if the calculated hash value and the hash value stored in the secure memory mismatch, declaring corrupted or changed the corresponding retrieved encrypted sensitive data or the corresponding encrypted subset.

A second aspect relates to a processing device including:
a processor with a first core and at least one second core;
a controller to manage switching from a first mode of operation to a second mode.

The processing device and the first and second cores are adapted to securely handle sensitive data when being in the first mode. The processor is connectable to a storage unit adapted to ensure persistency of data therein during periods of time when the first and the second cores are in the second mode. The controller is configured to:
send, to the first core and to the second core, a first message;
upon reception of a third message; sending, to the first core, of a fourth message to acknowledge reception of a third message.

The first core is configured to:
upon reception of the first message, store securely sensitive data handled by the first core;
upon reception of a second message, store securely, in the storage unit, other sensitive data;
send, to the controller, the third message, indicating the completion of the storing of the other sensitive data;
upon reception of the fourth message; send, a fifth message to the second core;
upon reception of the fourth messages and having sent the fifth message, enter into the second mode.

The second core is configured to:
upon reception of the first message, store securely sensitive data handled by the second core;
send to the first core, the second message indicating the completion of the storing of the sensitive data handled by the second core;
upon reception of the fifth message, enter into the second mode.

According to some embodiments, the first core and/or the second core are configured to store securely the sensitive data by:
collecting the sensitive data to be stored;
encrypting, based on at least one first set of data, the collected sensitive data;
storing the first set of data in a secure memory included in the processor, said secure memory being persistent during the periods of time when the first and the second cores are in the second mode;
storing, in the storage unit, the encrypted sensitive data.

A third aspect relates to a processing system including a processor according to the second aspect and a storage unit adapted to ensure persistency of data therein during periods of time when the first and the second cores are in the second mode.

A fourth aspect relates to an electronic device comprising a processing system according to the third aspect.

A fifth aspect relates to a computer program product comprising one or more stored sequences of instructions that are accessible to a processor and which, when executed by the processor, cause the processor to carry out the steps of method according to the first aspect defined above.

BRIEF DESCRIPTION OF THE DRAWINGS

The present invention is illustrated by way of example, and not by way of limitation, in the figures of the accompanying drawings, in which like reference numerals refer to similar elements and in which.

DESCRIPTION OF PREFERRED EMBODIMENTS

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

Figure 1:
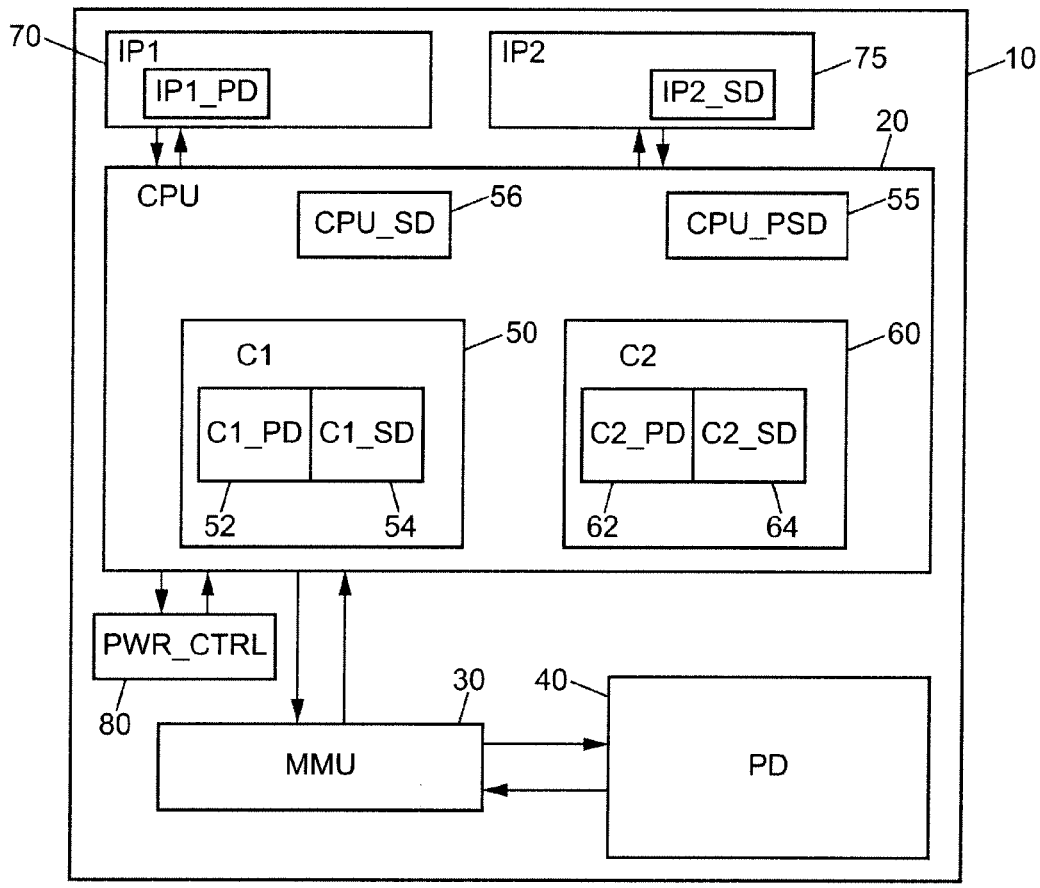
FIG. 1 is a schema of a processing device.

Referring now to FIG. 1, there is shown therein a processing device 10, according to an embodiment. The processing device comprises a processor or CPU 20, a first IP 70, a second secure IP 75, a MMU 30, and a public memory PD 40. The MMU 30 manages the access of the CPU 20 to the public memory 40. The MMU is typically integrated to the CPU 20, and may be adapted to handle the accesses to the first IP, to the second secure IP, and to the public memory. In this embodiment and in the description above, the architecture of the processing device 10 is based on separate units respectively for the CPU 20, the first IP 70, the second secure IP 75, the MMU 30, and the public memory 40. However, it will be understood by those skilled in the art that various other architectures may be appropriate. In particular, the components of the processing device could be grouped, for example, on one chip. By way of an example, the processing device may be a SoC platform.

The processing device may be embedded in a mobile phone, a personal assistant, or an embedded device. The processing device may also be a part of a mobile or a desktop computer. The processing device may be adapted notably to run an operating system and/or platform specific softwares.

The CPU comprises a first core 50 and a second core 60. Each core can be considered as a processor comprising notably its own arithmetic logic means to process instructions. In the embodiment illustrated by FIG. 1, the CPU comprises two cores. However, it will be understood that the CPU may comprise a greater number of cores, for example three, four, or more cores.

The first core 50 is arranged to provide two virtual processors 52, 54 backed by hardware based access control: the first virtual processor 52 is intended to be used to process non-sensitive data C1_PD in a context named public environment, whereas the second virtual processor 54 is dedicated to the processing of sensitive data C1_SD in a context named secure environment.

The second core 60 is arranged to provide two virtual processors 62, 64 backed by hardware based access control: the first virtual processor 62 is intended to be used to process non-sensitive data C2_PD in the public environment, whereas the second virtual processor 64 is dedicated to the processing of sensitive data C2_SD in the secure environment.

Notably the CPU is intended to be used to process sensitive data CPU_SD 56. The sensitive data CPU_SD 56 handled by the CPU may be data related to software and hardware context in common for the CPU and the cores.

The CPU comprises a shared persistent secure memory device 55 to securely store sensitive data of the secure environment, even during periods when the first and/or second core are in a low power or stand-by mode. The first core 50 and/or the second core 60 may comprise also or alternatively persistent secure memories (not illustrated in FIG. 1) to store sensitive data of the secure environment, even during periods when the first and/or second core are in a low power or stand-by mode.

The first IP 70 is only intended to manage non-sensitive data IP1_PD in the public environment. The second secure IP 75 is intended to handle sensitive data IP2_SD in the secure environment.

The public memory 40 is persistent during periods when the first core and/or the second core are in a low power or stand-by mode. Stated otherwise, the storage and the persistency of the data stored in the public memory are independent of the operational mode of the cores.

The processing device 10 comprises also a power management controller 80, coupled to the CPU 20. The power management controller 80 handles the transitions between a plurality of operational modes of the processing device 10. An operational mode defines a state in which a core provides a given set of functionalities at a given level of performances. For example, a full-feature mode may correspond to a state in which a core provides all its functionalities at its highest level of performances. A low power mode may correspond to a state in which a core provides only a subset of its functionalities at a lowered level of performances, some unused parts of the core being possibly powered-off. A stand-by mode may correspond to a state in which a core provides only a wake-up on events functionality, several parts of the core being powered-off. Depending on the design of the first core and the second core, the power management controller 80 may manage transitions between the different modes of the first and second core independently, or co-jointly. The power management controller 80 may also be configured to handle the transitions between two or more operational modes of the first IP 70 and/or the second secure IP 75. In a basic setup, the power management controller may be configured to handle the transition between a first mode and a second mode, the second mode being a stand-by mode, a low-power power mode, a power off mode, or a restricted functionality mode, for example.

In one embodiment, the CPU 20 is an ARM CPU, with security extensions, for example the TrustZone technology.

Figure 2:
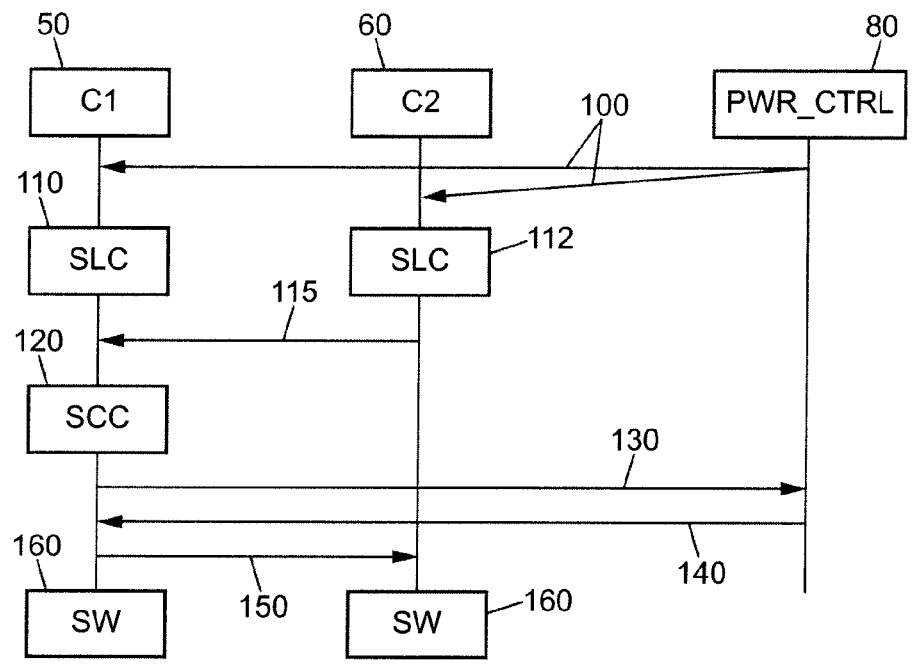
FIG. 2 is a flow chart illustrating steps of a process for switching the current mode of the first and the second cores of the CPU to a mode in which the first and the second cores cannot ensure the persistency of the sensitive data in their entirety.

Referring now to FIG. 2, there is shown therein the steps of a process, according to some embodiments, for switching the current mode of the first and the second cores of the CPU to a mode in which the first and the second cores cannot ensure the persistency of the sensitive data in their entirely. For example, the first core and the second core are both in a full-feature mode, and the power management controller has received a command to switch the first and the second cores from a given mode of operation into a stand-by mode. When both cores are in stand-by mode, the sensitive data C1_SD and C2_SD cannot be stored securely within the cores, and consequently cannot be restored when both cores return from stand-by mode to a full featured mode. In particular, the sensitive data C1_SD and C2_SD are generally too large to be kept entirely within the first and second persistent secure memory 55.

The data of the secure environment, which have to be saved and restored, might have several origins.

Said data includes the sensitive data C1_SD and C2_SD, which may comprise the contexts of the first and second cores. These data are dependent on the state of each core, meaning they have to be saved once per core. For example, referring to ARM cores, these data might be overall system control and configuration information, found in a system control coprocessor called "CP15". These data can also contain the contexts of IPs (not illustrated in FIG. 1) linked to the cores via for example an interrupt controller.

The CPU may also comprise sensitive data CPU_PSD related to the global CPU context, which have also to be saved and restored. These data, saved once globally, may be related to specific registers of IPs (not illustrated in FIG. 1) linked to the CPU, and in a particular example to an interrupt controller or a snoop control unit.

The data to be stored and restored may comprise the contents of one or more secure random access memories (not illustrated in FIG. 1) included in the first and/or second cores and/or the CPU. Said memories may comprise the content of stacks and/or heaps, instructions, static data related to the secure environment. In at least some embodiments, these data have to be saved once. The sensitive data IP2_SD are specific to the contents of the second secure IP.

Initially, the first and the second cores are in a first mode. One core amongst the first core and the second core is identified as a master core, the other core being identified as a slave core. In FIG. 2, the master core is the first core 50, whereas the slave core is the second core 60.

In a step 100, having received a request to switch the first and the second cores, to a second mode, the power management controller sends a first synchronization message to the master core and the slave core. The first synchronization message comprises information indicating the master and the slave cores that they must prepare themselves to enter into the second mode. In one embodiment of the step 100, the request to switch to the second mode is a secure interrupt. This embodiment allows direct communication between components involved in the switch without any additional link to an Operating System code.

In a step 110, the master core stores the sensitive data C1_SD in the shared persistent secure memory device 55. Before storing the sensitive data C1_SD, unnecessary data present in the persistent secure memory device 55 may be cleared in order to free memory spaces. Alternatively, in an embodiment, the sensitive data C1_SD may be stored in the public memory 40 in an encrypted form.

In a step 112, the slave core stores the sensitive data C2_SD in the shared persistent secure memory device 55. Before storing the sensitive data C2_SD, unnecessary data present in the persistent secure memory device 55 may be cleared in order to free memory spaces. Alternatively, in an embodiment, the sensitive data C2_SD may be stored in the public memory 40, in an encrypted form.

The step 110 and the step 112 may be performed sequentially, or in parallel.

In a step 115, the slave core sends a second synchronization message to the master core, once the step 112 has been completed.

The second synchronization message is used to inform the master core that the context of the slave core has been saved.

In a step 120, the master core stores, in the public memory 40, and in an encrypted form (thus, securely), sensitive data other than sensitive data C1_SD and C2_SD. This other sensitive data may be data handled by the processing device, which may include data related to the global CPU context, for example the sensitive data CPU_SD. It may also be sensitive data not bound to the processing device itself, such as an IP context or a memories context, for instance the sensitive data IP2_SD related to the second secure IP.

In a step 130, the master core sends a third synchronization message to the power management controller, once the step 120 has been completed. The second synchronization message is used to communicate result of the global context save operation performed during step 120 to the power management controller. For example, if an error has been detected or if all the operations have been performed as expected, the third synchronization message may contain information related to these events.

In a step 140, the power management controller sends a fourth synchronization message to the master core to acknowledge the reception of the third synchronization message and to communicate any error detected by the power management controller. Stated otherwise, this fourth message not only is used to acknowledge reception of the third message, but also to pass information about what happened on the power management controller side which could jeopardize entry into the stand-by mode (interrupts, errors, or other events . . . ). In fact, all possible errors thrown by the first core, the second core and the power management controller during the steps 130, 140 and 150, may be intercepted and handled so as to exit properly of the low power mode entry sequence, and to give execution back to public code which has required the entry to the low power mode.

In a step 150, having received the fourth synchronization message, the master core sends a fifth synchronization message to the slave core. The fifth synchronization message is used to inform the slave core of any error previously detected or, alternatively, the success of all the operations previously performed by the master core and the power management controller.

In a step 160, if no critical error has been reported in synchronization messages, the master core and the slave core switch to the second mode.

In one embodiment, related to ARM cores, the synchronization messages may be Fast Interrupt requests (FIQ). Alternatively, the synchronization messages can be implemented using synchronous or asynchronous electric signals, interruptions, software notifications, or any other suitable software or hardware messaging means.

Figure 3:
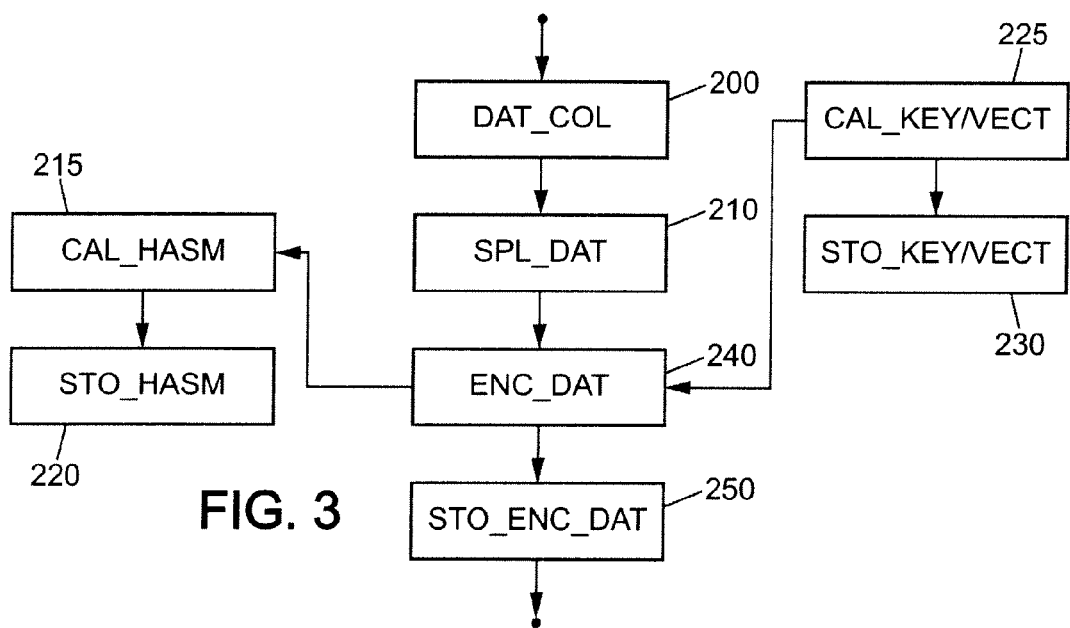
FIG. 3 is a flow chart illustrating steps of a process to store the sensitive data in an encrypted form.

Referring now to FIG. 3, there is shown therein the steps of a process, according to an embodiment, to store the sensitive data, in the public memory 40, in an encrypted form, while switching to the second mode. This process can be notably used to implement the step 110, 112 and/or 120.

This process is to ensure that sensitive data can't be corrupted, or retrieved when placed in public memory, e.g. when the first and the second cores are in a low power mode.

In a first step 200, the sensitive data to be stored are collected.

In an embodiment of the first step 200, sensitive data that are not identified as mandatory to store are not collected. For example, specific core mode stacks and specific routines to define these stacks area can be excluded from the mandatory data to store. In an embodiment, only sensitive data that are not already stored following a previous execution of this process and/or that have changed in the meantime, are identified as mandatory to store.

In an optional step 210, the collected sensitive data are split into subsets. The size of each subset may be chosen equal to the size of the entries of the MMU, typically 4 Kbytes, to avoid processing related to the mapping of data as logical addresses inside MMU tables. In some embodiments, all possible logical addresses are parsed, but real saving operations are based on physical addresses to fill a fixed length array in secure memory. Real size for the secure memory to be encrypted is then decreased significantly;

In a step 240, the collected sensitive data or the corresponding subsets are encrypted. In an embodiment of the step 240, an encryption scheme is used, for example, a symmetrical encryption scheme. Encryption allows avoiding public accesses to sensitive data stored in the public memory. To apply the encryption scheme, in a step 225, a first set of data is retrieved or generated. This set of data may be cryptographic data. The cryptographic data may be for example secret keys and/or cryptographic initialization vectors, used by the encryption scheme. More generally, cryptographic data are data which are the root of trust of the cryptographic mechanisms, like reference data used for all checks done on encrypted data. In a step 230, the cryptographic data are stored in a persistent secure memory, said persistent secure memory being persistent at least when the cores are in the second mode. For example, the persistent secure memory may be the first and/or the second persistent secure memory 55.

To increase the security level, the encryption scheme may use a different secret key for each subset. For example, a new secret key may be used every 4 Kbytes of encrypted sensitive data. Consequently, two subsets of encrypted sensitive data having an identical content are encrypted differently if they are not located on the same page, or at two different times on the same page. Each secret key can be stored in the step 230. Alternatively, only a seed value used to generate with a crypto-algorithm every secret key may be stored, ensuring a high level of security and a low impact in terms of memory use.

At least one hash value may be calculated, in a step 215, in applying a cryptographic hash function to the encrypted sensitive data or to each encrypted subset. In a step 220, the calculated hash value is stored in a persistent secure memory, said persistent secure memory being persistent at least when the cores are in the second mode. For example, the persistent secure memory may be the first and/or the second persistent secure memory 55, 65. The hash value may be used to check if a modification has been introduced in the encrypted sensitive data.

In a step 250, the encrypted sensitive data is stored in a storage, for example the public storage 40, which is persistent at least when the cores are in the second mode.

In an embodiment of the first step 200, only sensitive data that are not already stored in the external storage following a preceding execution of the process are collected. For example, a comparison of the sensitive data to collect with the encrypted sensitive data already stored in the external storage can be done using a hash function. The hash value calculated during step 215 can be used for this purpose. Alternatively, it is possible to detect any changes of the sensitive data, or of the subsets, since the preceding execution of the process, for example by flagging all synchronous or asynchronous entries inside the secure environment. If the sensitive data or the subsets have not been modified and if they are already stored on the external storage, they are not collected.

Figure 4:
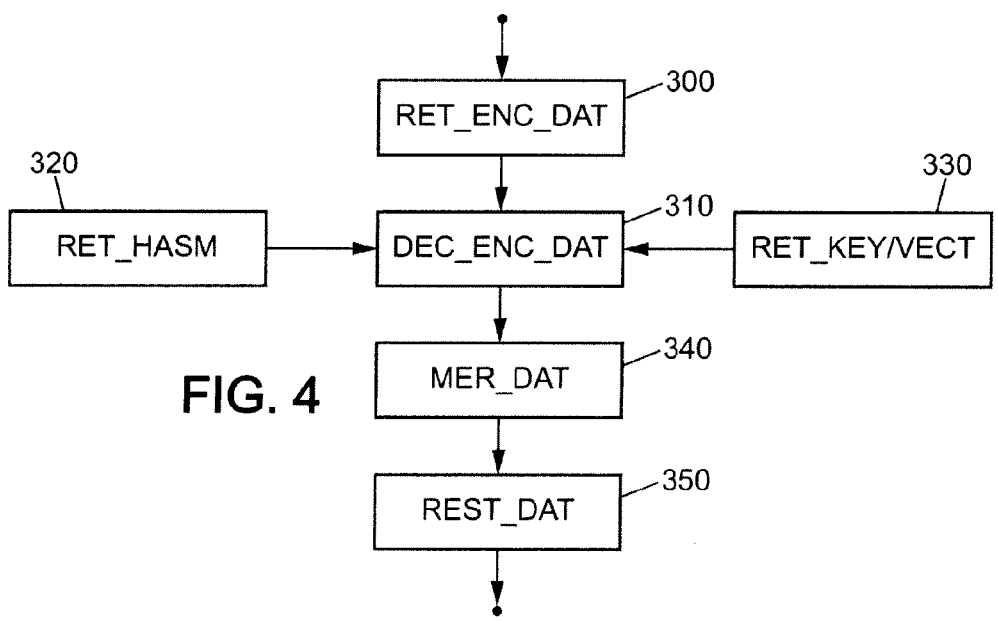
FIG. 4 is a flow chart illustrating steps of a process to restore the encrypted sensitive data stored in a storage.

Referring now to FIG. 4, there is shown therein the steps of a process, according to an embodiment, to restore the sensitive data, following a switch from the second mode to another mode. This process can be used to restore encrypted sensitive data, stored in the external storage by the storing process described previously and on FIG. 3

In a step 300, the encrypted sensitive data or the subset stored in the external storage are retrieved.

In an optional step 320, the hash values stored in the persistent secure memory are retrieved.

In a step 330, the cryptographic data stored in the persistent secure memory are retrieved.

In a step 310, the retrieved encrypted sensitive data or the corresponding subsets are decrypted using the retrieved cryptographic data and the cryptographic scheme. Optionally, during the step 310, the cryptographic hash function is applied to the retrieved encrypted sensitive data or to each encrypted subset, and the hash values are compared to the hash values retrieved in the step 320. If the comparison fails, the retrieved encrypted sensitive data are identified as modified.

In an optional step 340, if the decrypted sensitive data comprise subsets, they are merged to reconstitute the sensitive data.

In a step 350, the decrypted sensitive data are restored.

The process to store or restore the sensitive data as described above is inasmuch efficient that it can be integrated easily in the power strategy at system level. There may be a corresponding constraint on the proposed solution to maintain latency to a minimum value during the save/restore operation. If latency is not kept low enough, the gain of going into low power mode could be null or lost regarding the time required to enter this mode.

Several embodiments of the store and/or restore process proposed are aimed at addressing these performances aspects, and can be adopted either alone or in combination. The present invention can also be embedded in a computer program product, which comprises all the features enabling the implementation of the methods described herein, and which—when loaded in an information processing system— is able to carry out these methods. Computer program means or computer program in the present context mean any expression, in any language, code or notation, of a set of instructions intended to cause a system having an information processing capability to perform a particular function either directly or after conversion to another language. Such a computer program can be stored on a computer or machine readable medium allowing data, instructions, messages or message packets, and other machine readable information to be read from the medium. The computer or machine readable medium may include non-volatile memory, such as ROM, Flash memory, Disk drive memory, CD-ROM, and other permanent storage. Additionally, a computer or machine readable medium may include, for example, volatile storage such as RAM, buffers, cache memory, and network circuits. Furthermore, the computer or machine readable medium may comprise computer or machine readable information in a transitory state medium such as a network link and/or a network interface, including a wired network or a wireless network, that allow a device to read such computer or machine readable information.

The invention claimed is:

1. A method of managing switching from a first mode of operation to a second mode of a first core and at least one second core, both included in a processor of a processing device integrated on a chip, the processing device and the first and second cores being configured for securely handling sensitive data when being in the first mode, the processing device further comprising a controller configured for controlling switching to the second mode, the processor being coupled to a storage unit adapted to ensure persistency of data therein during periods of time when the first and second cores are in the second mode, the method comprising:

sending, by the controller to the first core and to the second core, a first message;

upon reception of the first message by the first and second core respectively, first storing securely sensitive data handled by the first core, and second storing securely sensitive data handled by the second core;

sending, by the second core to the first core, a second message indicating completion of the second storing;

upon reception of the second message by the first core, securely storing by the first core, in the storage unit, other sensitive data;

sending, by the first core to the controller, a third message indicating completion of the securely storing;

upon reception of the third message by the controller, sending by the controller to the first core a fourth message to acknowledge reception of the third message;

upon reception of the fourth message by the first core, sending by the first core to the second core a fifth message;

upon reception of the fourth and the fifth messages by the first and second cores respectively, entering by the first and the second cores into the second mode.

2. The method of claim 1, wherein at least one of the first, second, and third storings are performed by:
collecting the sensitive data to be stored;
encrypting, based on at least one first set of data, the collected sensitive data;
storing the first set of data in a secure memory included in the processor, the secure memory being persistent during the periods of time when the first and second cores are in the second mode;
storing, in the storage unit, the encrypted sensitive data.

3. The method of claim 2, wherein while collecting the sensitive data, only sensitive data identified as mandatory to store are collected.

4. The method of claim 2, wherein while collecting the sensitive data, only sensitive data that are not already stored are collected.

5. The method of claim 2, further comprising splitting the collected sensitive data into subsets of sensitive data before encrypting the collected sensitive data.

6. The method of claim 5, wherein while encrypting the collected sensitive data, a respective first set of data is used to encrypt each subset of sensitive data.

7. The method of claim 6, wherein only a seed value used to generate the respective first set of data with a crypto-algorithm is stored in the secure memory.

8. The method of claim 2, further comprising generating a hash value by applying a cryptographic hash function to the encrypted sensitive data or to each of an encrypted subset, and storing the generated hash value in the secure memory.

9. The method of claim 2, further comprising, when switching from the second mode to the first mode of operation:
retrieving the encrypted sensitive data or subsets of the encrypted sensitive data stored in the storage unit;
retrieving the first set of data stored in the secure memory;
decrypting the retrieved encrypted sensitive data or the subsets using the retrieved first set of data; and
restoring the decrypted sensitive data.

10. The method of claim 8, further comprising:
retrieving hash values stored in the secure memory;
calculating a hash value for the retrieved encrypted sensitive data or for each encrypted subset; and
comparing the hash values retrieved from the secure memory to the calculated hash value;
if the calculated hash value and the hash value retrieved from the secure memory mismatch, declaring corrupted or changed the corresponding retrieved encrypted sensitive data or the corresponding encrypted subset.

11. A processing device integrated on a chip, comprising:
a processor having a first core and at least one second core;
a controller configured for managing switching from a first mode of operation to a second mode of operation of the first and second cores;
the processing device and the first and second cores being configured for securely handling sensitive data when in the first mode, the processor being connectable to a storage unit configured for ensuring persistency of data therein during periods of time when the first and the second cores are in the second mode;
wherein the controller is configured for:
sending, to the first core and to the second core, a first message; and
upon reception of a third message, sending to the first core a fourth message to acknowledge reception of the third message;
the first core is configured for:
upon reception of the first message, securely storing sensitive data handled by the first core;
upon reception of a second message, securely storing other sensitive data in the storage unit;
sending the third message to the controller, indicating completion of storing the sensitive data handled by the processing device;
upon reception of the fourth message, sending a fifth message to the second core; and
upon reception of the fourth messages and having sent the fifth message, entering the second mode; and
the second core is configured for:
upon reception of the first message, securely storing sensitive data handled by the second core;
sending the second message to the first core, indicating completion of storing the sensitive data handled by the second core; and
upon reception of the fifth message, entering the second mode.

12. The processing device of claim 11, wherein the first core and/or the second core are configured for securely storing the sensitive data by:
collecting the sensitive data to be stored;
encrypting collected sensitive data based on at least one first set of data;
storing the first set of data in a secure memory in the processor, the secure memory being persistent during the periods of time when the first and second cores are in the second mode; and
storing the encrypted sensitive data in the storage unit.

13. The processing device of claim 11, further including the storage unit configured for ensuring persistency of data therein during periods of time when the first and second cores are in the second mode.

14. The processing device according to claim 11, wherein the processing device is included in an electronic device.

15. A non-transitory computer readable storage medium, having stored thereon a computer program comprising program instructions for managing switching a first core and at least one second core from a first mode of operation to a second mode of operation, the first and second cores being included in a processor of a processing device integrated on a chip, the processing device and the first and second cores being configured for securely handling sensitive data when in the first mode, the processing device further including a controller configured for controlling switching to the second mode, the processor being coupled to a storage unit configured for ensuring persistency of data therein during periods of time when the first and the second cores are in the second mode, the computer program being loadable into a data-processing unit and when executed causing the data-processing unit to carry out a method that comprises:
sending a first message by the controller to the first core and to the second core;

upon reception of the first message by the first and second core respectively:
  first storing securely sensitive data handled by the first core; and
  second storing securely sensitive data handled by the second core;
sending a second message by the second core to the first core, the second message indicating completion of the second storing;
upon reception of the second message by the first core, third storing securely, by the first core in the storage unit, other sensitive data;
sending a third message by the first core to the controller, the third message indicating completion of the third storing;
upon reception of the third message by the controller, sending, by the controller to the first core, a fourth message acknowledging reception of the third message;
upon reception of the fourth message by the first core, sending, by the first core to the second core, a fifth message; and
upon reception of the fourth and the fifth messages by the first and second cores respectively, entering the second mode by the first and the second cores.

* * * * *